US012562036B1

(12) United States Patent
Romero, Jr. et al.

(10) Patent No.: US 12,562,036 B1
(45) Date of Patent: Feb. 24, 2026

(54) CARD REPLACEMENT SERVICES BY AN AUTOMATED TELLER MACHINE

(71) Applicant: UIPCO, LLC, San Antonio, TX (US)

(72) Inventors: Jose L. Romero, Jr., San Antonio, TX (US); Andre Rene Buentello, San Antonio, TX (US); Nina Schuessler, San Antonio, TX (US); Jennifer Hunt Erickson, San Antonio, TX (US); Breanna Nicole Allerkamp, Boerne, TX (US); Kevin Mcadams, Boerne, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/931,259

(22) Filed: Oct. 30, 2024

Related U.S. Application Data

(60) Provisional application No. 63/594,634, filed on Oct. 31, 2023.

(51) Int. Cl.
| | |
|---|---|
| *G07F 19/00* | (2006.01) |
| *G06Q 20/34* | (2012.01) |
| *G06Q 20/40* | (2012.01) |

(52) U.S. Cl.
CPC ......... G07F 19/203 (2013.01); G06Q 20/341 (2013.01); G06Q 20/40 (2013.01)

(58) Field of Classification Search
CPC ..... G07F 19/203; G06Q 20/341; G06Q 20/40

USPC .......................................................... 235/379
See application file for complete search history.

(56) References Cited

U.S. PATENT DOCUMENTS

| | | | | |
|---|---|---|---|---|
| 6,648,220 | B1 * | 11/2003 | Junkins .................. | G06Q 30/04 |
| | | | | 235/379 |
| 8,157,164 | B1 * | 4/2012 | Billman ................ | G07F 19/203 |
| | | | | 235/375 |
| 2014/0358777 | A1 * | 12/2014 | Gueh .................. | G06Q 20/1085 |
| | | | | 705/43 |
| 2018/0018656 | A1 * | 1/2018 | Goldberg .............. | H04L 63/083 |
| 2018/0018669 | A1 * | 1/2018 | Goldberg .............. | G06Q 20/34 |
| 2020/0082407 | A1 * | 3/2020 | Clower ................ | G06Q 20/108 |
| 2021/0326817 | A1 * | 10/2021 | Novis ................ | G06Q 20/1085 |

* cited by examiner

*Primary Examiner* — Allyson N Trail
(74) *Attorney, Agent, or Firm* — Potomac Law Group, PLLC; Dannon G. Allbee

(57) ABSTRACT

Aspects of the present disclosure are directed to an automated teller machine (ATM) having card replacement capabilities (e.g., credit cards, debit cards, identification cards, membership cards, gift cards, etc.). The cards can include cards issued by the entity controlling the ATM and/or cards issued by third-party entities. In some implementations, the cards can be pre-scanned into the ATM by a user with their data captured and stored by the ATM. The ATM can program and issue a generic card, or can print the card with the card number and user information. In some implementations, the card can be temporary (i.e., only valid for a limited time, such as 30 days) with a full replacement card later mailed, or can be a full replacement card having a standard expiration date 3 (e.g., years).

20 Claims, 9 Drawing Sheets

300

302 processing 304
units working 306
memory

310
I/O storage 308
memory

320

326
BIOS

322
OS local 324
programs

340

342
interfaces user 344
authentication
module 346
request receipt
module 348
data access
module payment 350
instrument
determination
module 352
ATM instruction
module

600

CARD REPLACEMENT SERVICES BY AN AUTOMATED TELLER MACHINE

CROSS-REFERENCE TO RELATED APPLICATIONS

This application claims priority to U.S. Patent Application No. 63/594,634, titled "Card Replacement Services by an Automated Teller Machine," filed on Oct. 31, 2023 and which is herein incorporated by reference in its entirety.

TECHNICAL FIELD

The present disclosure is directed to an automated teller machine (ATM) providing card replacement services.

BACKGROUND

Conventional automated teller machines (ATMs) are physical electronic banking devices that allow users to complete basic financial transactions without the assistance of a human teller or other bank employee. After inserting a debit, bank, or credit card and a correct personal identification number (PIN), users can perform multiple functions, including checking an account balance, transferring funds, withdrawing funds, and depositing checks and cash. ATMs therefore provide convenience to users who do not wish to enter a bank branch, who are not close to a bank branch, and/or who wish to complete basic financial transactions outside of normal bank branch hours.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Although traditional automated teller machines (ATMs) provide convenience for banking and are generally widely accessible and available, they are limited to only very basic financial transactions. Aspects of the present disclosure are directed to an ATM providing improved functionality, e.g., card replacement capabilities (e.g., credit cards, debit cards, identification cards, membership cards, gift cards, transit cards, etc.). The cards can include cards issued by the entity controlling the ATM and/or cards issued by third party entities. In some implementations, the cards can be pre-scanned into the ATM by a user with their data captured and stored by the ATM. The ATM can program and issue a generic card, or can print the card with the card number and user information. In some implementations, the card can be temporary (i.e., only valid for a limited time, such as 30 days) with a full replacement card later mailed, or can be a full replacement card having a standard expiration date (e.g., 3 years).

For example, a user can input payment instrument data (e.g., card number, card verification value (CVV), expiration data, cardholder's name, billing address or zip code, etc.) to an ATM or a computing system in operable communication with the ATM (e.g., a computing system of a financial institution managing the ATM), such as by swiping the cards at the ATM, entering card details on a website, linking to a card provider service (e.g., bank), etc. The ATM or computing system can store such card data locally or on a cloud, associated with an identifier of the user, in an encrypted format. When the user needs creation of a card having stored payment instrument data (e.g., due to loss, damage, expiration, when a duplicate card is desired, etc.), the user can simply be authenticated by the ATM, request the card having stored payment instrument data, and receive the payment card from the ATM, all in a single transaction. Thus, the user does not have to request the card from the issuer, which may require a 5-7 business day turnaround time or longer in mail. Further, even if the issuer has a branch capable of providing card printing services via a teller, the user does not have to physically visit the branch, speak with a teller, and/or visit the branch within its open hours.

Figure 1:
FIG. 1 is a block diagram illustrating an overview of devices on which some implementations can operate.
Figure 1:
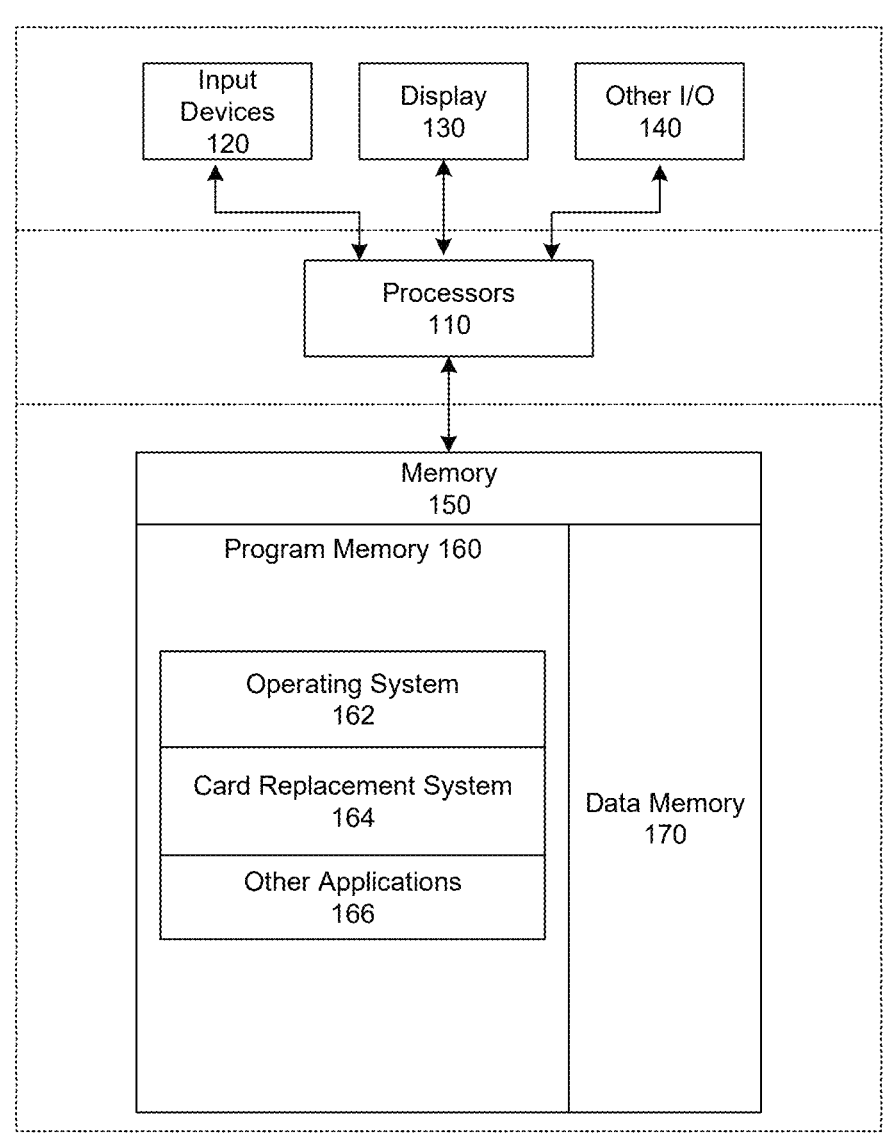

Several implementations are discussed below in more detail in reference to the figures. FIG. 1 is a block diagram illustrating an overview of devices on which some implementations of the disclosed technology can operate. The devices can comprise hardware components of a device 100 that can provide card replacement services. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, card replacement system 164, and other application programs 166. Memory 150 can also include data memory 170, e.g., authentication data, graphical user interface (GUI) data, payment instrument data, payment card data, card type data, encoding data, printing data, configuration data, settings, user options or preferences, etc., which can be provided to the program memory 160 or any element of the device 100.

In various implementations, the technology described herein can include a non-transitory computer-readable storage medium storing instructions, the instructions, when executed by a computing system, cause the computing system to perform steps as shown and described herein. In various implementations, the technology described herein can include a computing system comprising one or more processors and one or more memories storing instructions that, when executed by the one or more processors, cause the computing system to steps as shown and described herein.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
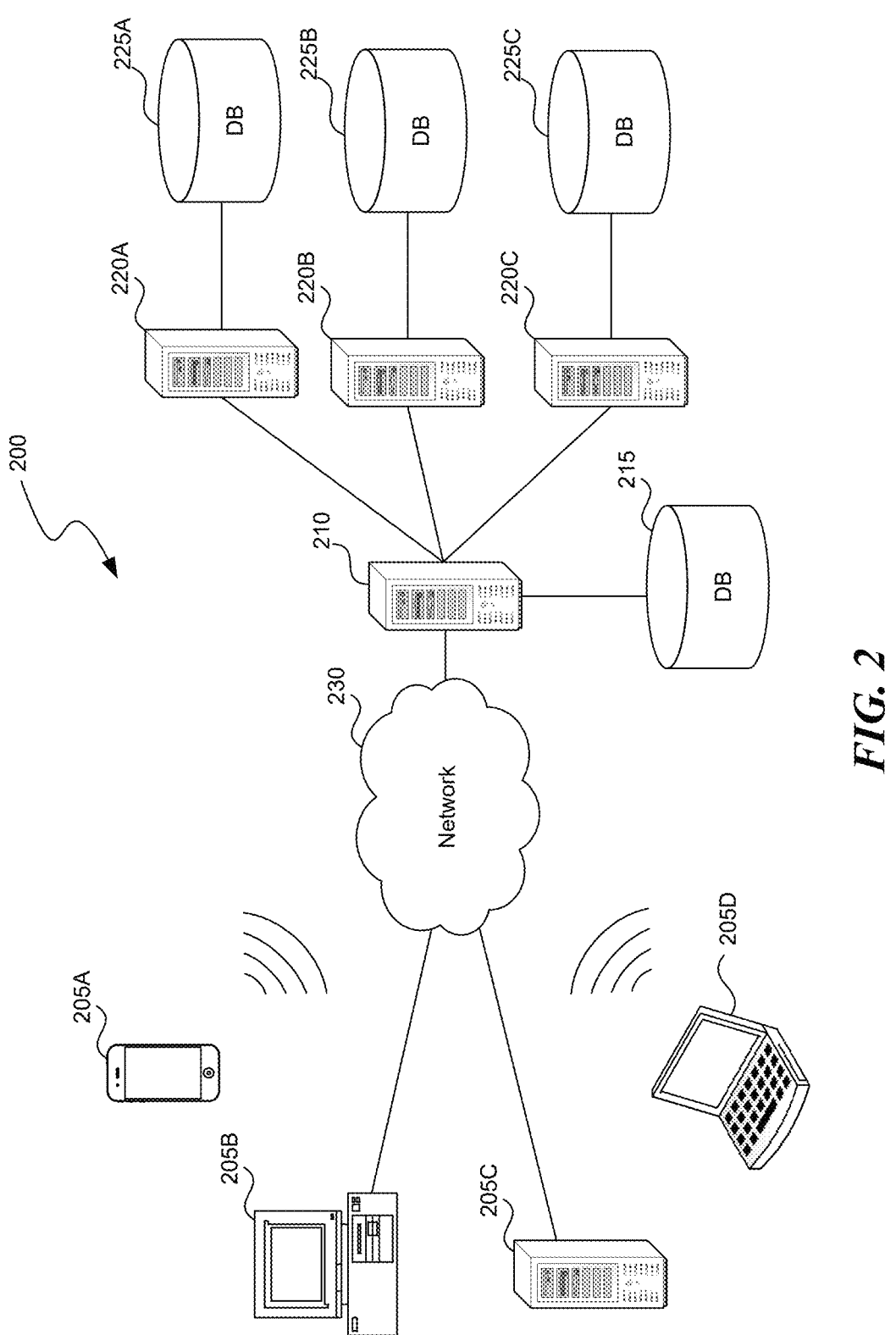
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as authentication data, graphical user interface (GUI) data, payment instrument data, payment card data, card type data, encoding data, and/or printing data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
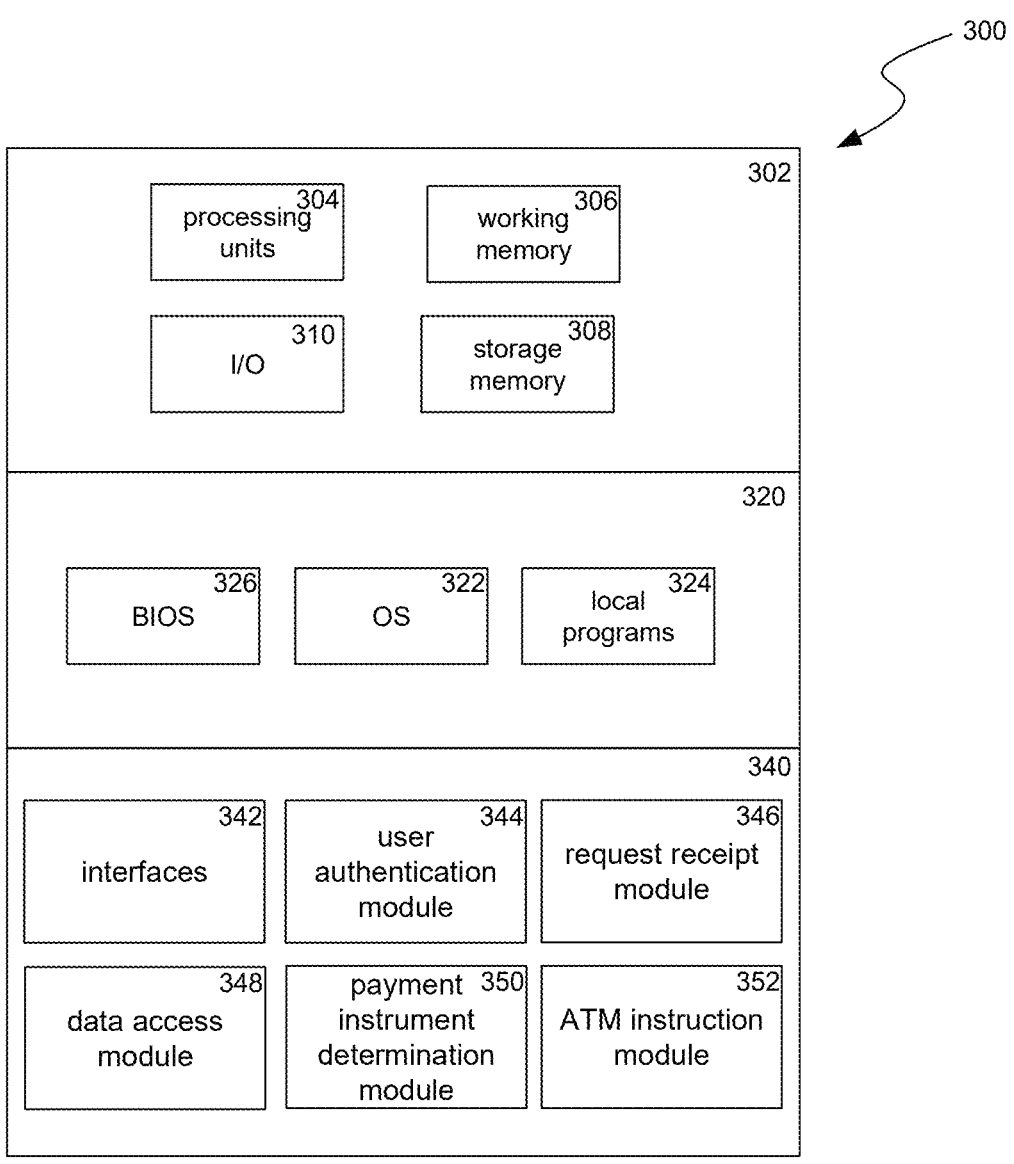
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include user authentication module 344, request receipt module 346, data access module 348, payment instrument determination module 350, automated teller machine (ATM) instruction module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications. In some implementations, components 300 can execute process 400 of FIG. 4. In some implementations, specialized components 340 can be included in card replacement system 164 of FIG. 1, described further herein.

User authentication module 344 can authenticate a user of the ATM. For example, user authentication module 344 can authenticate the user by confirming a correct personal identification number (PIN) number entered with a swiped debit or credit card, by confirming a correct password associated with the user's username, etc. In another example, if the ATM has access to a previously captured image of the user (e.g., from a known authentic image of the user, such as from an identification card, from a previously captured image of the user after authentication, etc.), user authentication module 344 can capture, via a camera included in input/output devices 310, a current image of the user at the ATM. User authentication module 344 can then perform facial recognition techniques to compare the two images and determine if the user at the ATM is the same user depicted in the previously captured image. In some implementations, user authentication module 344 can authenticate the user by comparing captured biometric data to previously captured, known authentic biometric data associated with the user, such as iris data, fingerprint data, etc. Further details regarding authenticating a user of an ATM are described herein with respect to block 402 of FIG. 4.

Request receipt module 346 can receive a request from the user, via the ATM, for an electronically readable payment card. In some implementations, the user can make the request using a graphical user interface (GUI) rendered on the ATM. In some implementations, the user can make the request using one or more input/output devices included in input/output devices 310. For example, the user can make the request by selecting an option to request an electronically readable payment card and/or selecting a stored payment instrument from a touchscreen, with physical buttons, with a mouse or trackpad, etc. In some implementations, the user can make the request via a separate computing device (e.g., using a dedicated application on a mobile phone allowing access to stored payment instrument data by the user). Further details regarding receiving a request from a user, via an ATM, for an electronically readable payment card are described herein with respect to block 404 of FIG. 4.

Data access module 348 can access, based on authentication of the user by user authentication module 344, stored data for one or more payment instruments associated with the user. The payment instrument data can be obtained from one or more of a plurality of sources having access to data relevant to payment instruments associated with the user, such as over a network (e.g., network 230 of FIG. 2). For example, data access module 348 can obtain payment instrument data from a computing system of a financial institution, such as a bank issuing the ATM in which specialized components 340 reside, or another financial institution not associated with the ATM (e.g., linked by the user to the institution providing the ATM). Such payment instrument data may include, for example, account numbers, cardholder names, expiration dates, card verification values (CVVs), billing addresses, credentials (e.g., username/password for another institution), etc. In another example, data access module 348 can obtain payment instrument data from a computing device of a user, such as payment instrument data that the user uploaded to a website associated with the ATM or its issuer (e.g., as stored securely on a cloud). In still another example, data access module 348 can obtain payment instrument data stored from a previous swipe on a card reader integral with or in operable communication with the ATM. Further details regarding accessing stored data for one or more payment instruments associated with a user are described herein with respect to block 406 of FIG. 4.

Payment instrument determination module 350 can determine that the data, accessed by data access module 348, includes payment instrument data for a payment instrument corresponding to the electronically readable payment card requested by the user via request receipt module 346. For example, payment instrument determination module 350 can query storage memory 308 for payment instrument data corresponding to data in the request, such as a card title (e.g., "debit card"), a card issuer (e.g., "ABC Bank" or "XYZ Store"), any portion of the card number (e.g., last 4 numbers), etc. Payment instrument determination module 350 can, in some implementations, further determine that it has sufficient payment instrument data to encode an electronically readable payment card (e.g., at least the card number and expiration date). In some implementations, payment instrument determination module 350 can return all payment instrument data for all stored payment instruments, such as when the request is to replace all cards (e.g., in the case of a lost wallet). Further details regarding determining that stored data, for one or more payment instruments associated with a user, includes payment instrument data for a stored payment instrument corresponding to an electronically readable payment card requested by a user are described herein with respect to block 408 of FIG. 4.

ATM instruction module 352 can instruct the ATM to encode an electronically readable payment card with the payment instrument data determined by payment instrument determination module 350. In response to the instruction, the ATM can obtain a "blank," unprogrammed magnetic stripe and/or chip card, and encode the magnetic stripe (e.g., with a magnetic stripe encoder) and/or the chip (e.g., with a chip encoder) with a card number, expiration date, cardholder name, CVV code, etc., as included in the payment instrument data. In some implementations, ATM instruction module 352 can further instruct the ATM to print the electrically readable payment card with some or all of the payment instrument data via a printer, embosser, or etcher (as used herein, "printing" can refer to any of these or other data recording techniques). Upon encoding and/or printing the electronically readable payment card, ATM instruction module 352 can instruct the ATM to dispense the card, e.g., through a card dispenser. In some implementations, instead of encoding and dispending a physical payment card, the ATM can instead provide an electronic version of the payment card to a device of the user—e.g., which can be stored and used from an electronic walled on the device. Further details regarding encoding an electronically readable payment card with payment instrument data are described herein with respect to block 410 of FIG. 4. Further details regarding dispensing an electronically readable payment card are described herein with respect to block 412 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
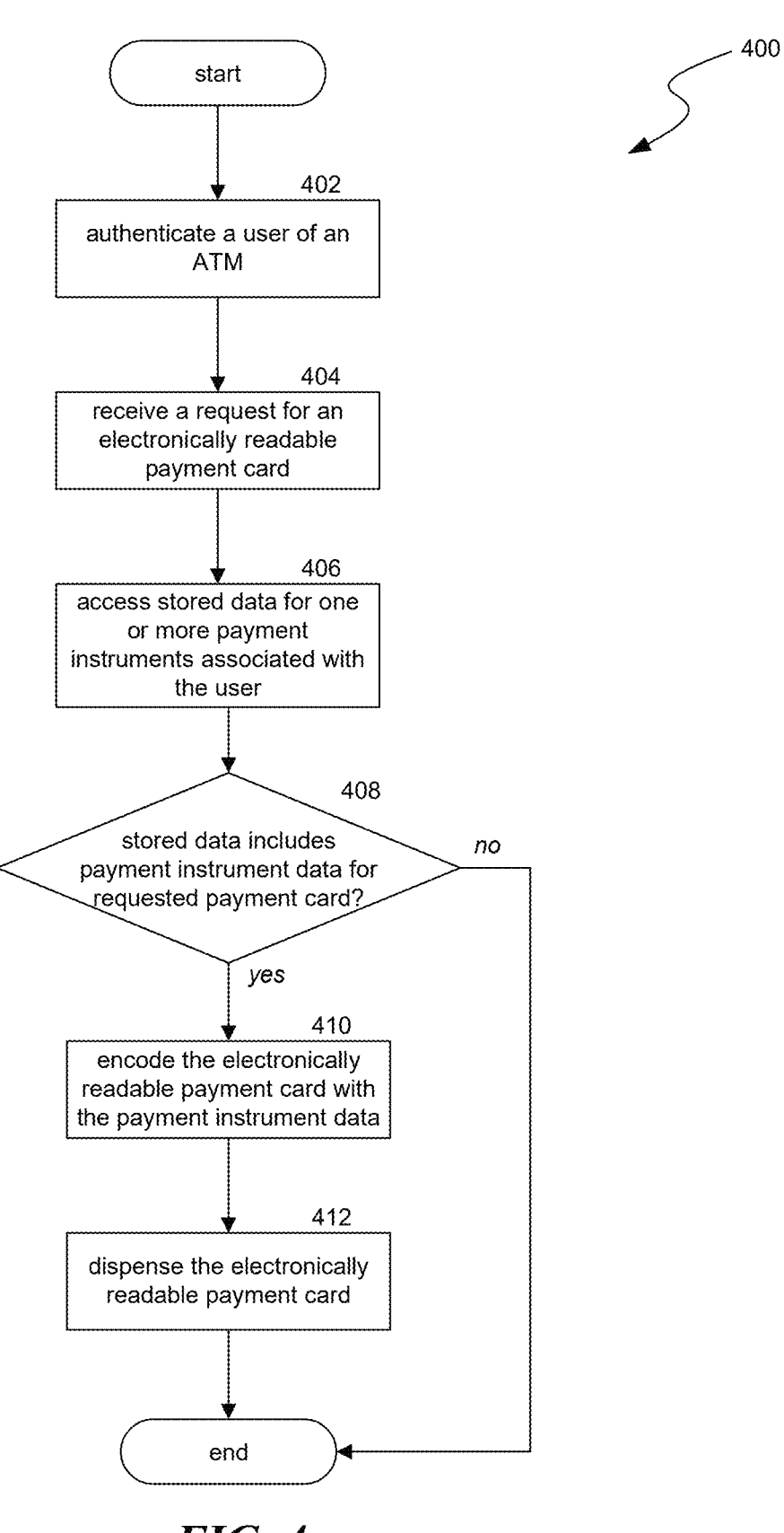
FIG. 4 is a flow diagram illustrating a process used in some implementations for providing card replacement services by an automated teller machine (ATM).

FIG. 4 is a flow diagram illustrating a process 400 used in some implementations for providing card replacement services by an automated teller machine (ATM). In some implementations, process 400 can be performed as a response to authentication of a user of the ATM having capabilities for card replacement services. In some implementations, process 400 can be performed by the ATM and its integral components (e.g., ATM 500 of FIG. 5 and/or ATM 600 of FIG. 6). In some implementations, process 400 can be performed by card replacement system 164 of FIG. 1.

At block 402, process 400 can authenticate a user of the ATM. In some implementations, process 400 can authenticate the user of the ATM by verifying that a correct personal identification number (PIN) has been entered relative to an inserted credit card or debit card associated with the user. In some implementations, process 400 can authenticate the user of the ATM via biometric data, such as by comparing stored iris and/or fingerprint data associated with the user to current iris and/or fingerprint data for the user captured by the ATM to confirm that the user is the same user. In another example, if process 400 has a stored image of the user (e.g., from an identification card, from a previously captured photograph when the user previously used the ATM, etc.), process 400 can capture a current image of the user at the ATM and perform facial recognition techniques on the images to determine if the user is the same user. Further details regarding authenticating a user by an ATM are described herein with respect to FIGS. 5 and 6.

At block 404, process 400 can receive a request from the user, via the ATM, for an electronically readable payment card. The electronically readable payment card can include, for example a credit card, a gift card, a debit card, etc. Although described primarily herein as being a payment card, however, it is contemplated that any electronically readable card can be provided by process 400, such as identification cards, membership cards, etc.

In some implementations, process 400 can receive the request via a graphical user interface (GUI) presented to the user on a display of the ATM. In some implementations, the GUI can be presented on a touchscreen display through which touch input can be received from the user. Alternatively or additionally, process 400 can receive the request via one or more other input devices, such as a trackpad, a keyboard, a mouse, a microphone, etc. Further details regarding input devices through which the ATM can receive requests are described herein with respect to FIGS. 5 and 6.

In some implementations, process 400 can receive the request, directly or indirectly, from a computing device of the user. For example, the user can execute an application presenting a GUI for managing respective payment instruments on the computing device. The user can preselect which payment instruments to produce as an electronically readable payment card, and remotely transmit the request to the ATM over a network, such that the payment instrument can be encoded and dispensed when the user is authenticated in-person at the ATM. In some implementations, the computing device can locally transmit the request to the ATM over a network, such as Bluetooth, Bluetooth LE, NFC, etc., while the user is physically present at the ATM with the computing device. An exemplary GUI that can be presented on the ATM and/or a mobile device of a user to request an electronically readable payment card is shown and described herein with respect to FIG. 7.

Although illustrated as block 402 being performed prior to block 404, it is contemplated that, in some implementations, block 404 can be performed prior to block 402. For example, the user can approach the ATM and first request a service for card replacement, then be authenticated by process 400, e.g., by entering a card and PIN number, by comparing a current photograph to a previously captured photograph, by providing biometric data, etc. Process 400 can then display a GUI on the ATM listing payment instruments from wish the user can select a card to encode and dispense, as described further herein.

At block 406, process 400 can access, based on authentication of the user at block 402, stored data for one or more payment instruments associated with the user. In some implementations, process 400 can previously store the data for a payment instrument based on the user's previous use and/or insertion of the payment instrument at the ATM. For example, by the user inserting a debit or credit card into the ATM, process 400 can capture the data stored on the debit or credit card (e.g., card number, expiration date, card verification value (CVV), name, etc.) via, for example, a magnetic stripe reader or chip reader. In some implementations, process 400 can previously store the data for a payment instrument based on a manual entry by the user of the payment instrument data, either at the ATM or by accessing a website hosted by a computing system associated with an entity controlling the ATM. In some implementations, process 400 can obtain stored data for a payment instrument from a computing system associated with a third-party entity not controlling the ATM, such as by requesting the data based on credentials or an identifier of the user obtained during authentication. For example, a user may have linked a credit card account to an institution associated with the ATM, allowing the ATM to obtain whatever card information is most current for the user, without the user having to update it whenever a card is updated or a new card is issued. Thus, in some cases, the card data at block 406 is obtained for the authenticated user, before the user requests the specific card they want printed at block 404.

In some implementations, process 400 can store data for the payment instruments in one or more databases. The one or more databases can include, for example, cloud storage allocated to the user, local storage, and/or storage on another computing device or system in operable communication with the ATM. Process 400 can store the data for the payment instruments in association with one or more identifiers of the user. For example, process 400 can store the data for the payment instruments in association with a name of the user, a card number associated with the user (e.g., credit or debit card number), a PIN number associated with a card of the user, a photograph of the user, biometric data of the user (e.g., an iris scan, a fingerprint, etc.), a partial social security number of the user, a username of the user, a password of the user, a unique string of characters associated with the user, a key or hash generated for the user, and/or the like.

At block 408, process 400 can determine that the data, for the one or more payment instruments associated with the user, includes payment instrument data for a payment instrument, of the one or more payment instruments, corresponding to the electronically readable payment card requested by the user. For example, from a GUI displayed on the ATM, the user can request reproduction of a lost debit card. Process 400 can search the data for payment instruments associated with the user, and determine that it has the necessary data to physically reproduce the debit card (e.g., card number, PIN number, CVV, name, etc.) requested by the user. Although illustrated as blocks 406-408 being performed after block 404, it is contemplated that, in some implementations, upon authentication, process 400 can obtain data for payment instruments associated with the user and can display, via a GUI, available payment instruments. Thus, the user can select a payment instrument from which to create an electronically readable payment card from the GUI, thereby generating the request at block 404.

At block 410, process 400 can encode the electronically readable payment card with the payment instrument data. The ATM can store blank, programmable cards that process 400 can access to encode as a payment instrument. In some implementations, process 400 can encode the electronically readable payment card with the payment instrument data by encoding a magnetic stripe on the card. As appreciated by one skilled in the art, the magnetic stripe can be composed of iron-based particles in a plastic film. By applying magnetic pull, the particles within the magnetic stripe can be magnetized in different directions (i.e., encoded). Thus, the magnetic stripe can store the payment instrument data as a pattern of positive and negative magnetic stripe fields that, when read by a magnetic stripe reader, can be decoded and translated into a usable format (e.g., a card number, a cardholder name, a CVV, an expiration date, etc.).

In some implementations, process 400 can encode the electronically readable payment card with the payment instrument data by programming a readable chip on the card, such as an EMV chip. The chip can be an embedded integrated circuit chip (ICC) that stores encrypted data, such as a card number, an expiration data, a name of the user, a CVV, etc. In some implementations, for further security, process 400 can further encode the chip with a token generated for a previous transaction using the selected payment instrument. In some implementations, process 400 can determine or generate the token for the new card by accessing a record of the most recent transaction, e.g., as requested from a computing system associated with the issuer of the payment instrument. In some implementations, process 400 can set the token as a default token, and request that the issuer of the payment instrument reset the token for the previous transaction to the default, such that the card can be used without regard to the previous transaction. In some implementations, process 400 can encode the electronically readable payment card with the payment instrument data via both a magnetic stripe and a chip.

At block 412, process 400 can dispense, via the ATM, the electronically readable payment card. In some implementations, process 400 can dispense the electronically readable payment card as a visually generic card, i.e., as visually having no payment instrument or user-specific information. In some implementations, the card can be temporary for a short period of time (e.g., 30 days), and process 400 can initiate a request to print and mail a permanent card to the user. In some implementations, however, prior to dispensing the card, process 400 can print and/or emboss at least a portion of the payment instrument data on the electronically readable payment card, such as the user's name, the card number, the expiration data, the CVV, etc. Thus, in some implementations, the electronically readable payment card can have a standard expiration data (e.g., 3 years from date of issuance). An exemplary card printer, embosser, and card dispenser are described further herein with respect to FIGS. 5 and 6. In some implementations, block 402-412 of process 400 can be performed in a single transaction, i.e., the user requests and obtains the electronically readable payment card in a single visit to the ATM.

Figure 5:
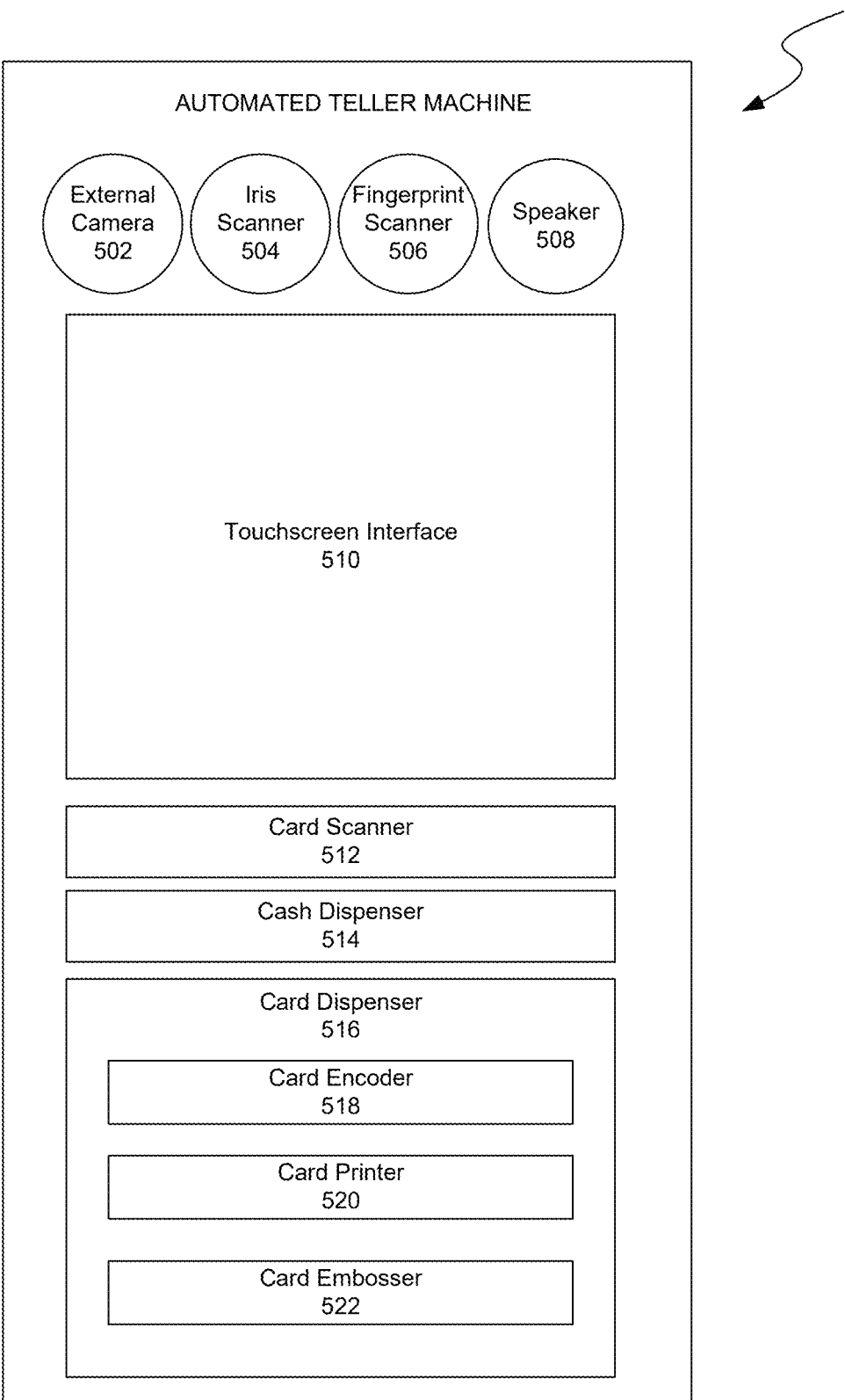
FIG. 5 is a block diagram illustrating components of an ATM according to some implementations.

FIG. 5 is a block diagram illustrating components of an automated teller machine (ATM) 500 according to some implementations, which can execute any of the functions described herein. ATM 500 can include external-facing camera 502, iris scanner 504, fingerprint scanner 506, speaker 508, touchscreen interface 510, card scanner 512, cash dispenser 514, and card dispenser 516 (including card encoder 518, card printer 520, and/or card embosser 522, in some implementations). Although illustrated as including particular components 502-522, it is contemplated that, in some implementations, one or more of components 502-522 can be omitted, and/or one or more conventional ATM components can be added to those illustrated, as appreciated by one skilled in the art.

External-facing camera 502 can capture a video or still image of a user of ATM 500. For example, camera 502 can capture a face of the user while using ATM 500. In some implementations, ATM 500 can extract facial features from the image(s) captured by camera 502 (e.g., corners of eye, eye centers, nose curvature, width of mouth, cheekbones, shape of jawline, etc.) and compare them to previously captured facial images and/or previously identified facial features of the user (e.g., from a government-issued identification card of the user, from previously captured images of the user at ATM 500 or at a banking branch, etc.). In some implementations, ATM 500 can authenticate the user if the image(s) captured by camera 502 match such known historical image(s) of the user, which can be confirmed by performing such facial recognition techniques. Authentication of the user via camera 502 can allow the user to access the functions described herein of ATM 500.

Iris scanner 504 can scan the iris of the user of ATM 500 (e.g., when an iris image is used as biometric data to authenticate the user). In some implementations, external-facing camera 502 can alternatively or additionally capture the image of the iris of the user. Iris scanner 504 can capture the unique patterns in the iris of the user with invisible infrared light to pick up detailed patterns that may not be visible to the naked eye. In some implementations, ATM 500 can compare the captured iris patterns to previously captured, known iris patterns of the user, in order to authenticate the user, and in order for the user to access the functions of ATM 500.

Fingerprint scanner 506 can scan one or more fingerprints of the user of ATM 500 (e.g., when one or more fingerprint images are used as biometric data to authenticate the user). Fingerprint scanner 506 can use any suitable fingerprint scanning technology. For example, in some implementations, fingerprint scanner 506 can be an optical scanner configured to shine light over the fingerprint and take a digital image of the fingerprint. The optical scanner can convert ridges and valleys of the fingerprint into a binary code representative of the fingerprint, which ATM 500 can compare to a previously captured, known binary code representative of the user's fingerprint, in order to authenticate the user. In some implementations, fingerprint scanner 506 can be a capacitive fingerprint scanner configured to measure conductivity of the finger and create a digital image based on its electrostatic field. ATM 500 can then compare the generated digital image to a previously captured, known digital image of the fingerprint to authenticate the user, in order for the user to access the functions of ATM 500.

Speaker 508 can output an audio signal in response to input by a user of ATM 500 and/or in response to a trigger event. For example, speaker 508 can output audible instructions while using ATM 500, such as for a user having a visual impairment. In such examples, it is contemplated that ATM 500 can further include a microphone (not shown) to receive audible commands by the user.

Touchscreen interface 510 can include a display screen configured to render a graphical user interface (GUI) for providing user access to the functions of ATM 500 described herein. In some implementations, touchscreen interface 510 can be a touch capacitive input interface. For example, touchscreen interface 510 can include a touch capacitive layer overlaid on a display layer (e.g., a light emitting diode (LED) or liquid crystal display (LCD) layer) to allow touchscreen interface 510 to receive input while displaying the GUI. Although described herein as being a touchscreen interface 510, however, it is contemplated that in some implementations, ATM 500 can include separate components for displaying the GUI and receiving input, such as through a mouse, a touchpad, one or more physical buttons, a keyboard, a number pad, etc., some of which are illustrated herein relative to FIG. 6.

Card scanner 512 can be configured to scan an inserted debit or credit card, when such a card is used to authenticate the user of ATM 500 (separately or in conjunction with an entered PIN number). In some implementations, card scanner 512 can scan the card via a magnetic reading head reading the magnetic stripe on the card. In some implementations, card scanner 512 can scan the card via an embedded EMV chip on the card, which can include an integrated circuit. Card scanner 512 can read the EMV chip via contact with the card or without contact with the card (e.g., using near field communication (NFC)). By authenticating the user via card scanner 512, ATM 500 can provide the user with access to its functions described herein. Further, card scanner 512 can be configured to capture payment instrument data from an inserted debit or credit card for storage, such that ATM 500 can later reproduce the card, as described further herein.

Cash dispenser 514 can be configured to dispense cash in response to a withdrawal request made by the user via ATM 500. For example, the user can insert the card into card scanner 512, which can read an account number associated with the card. The user can then enter the card's associated PIN number via a number pad for authentication. Upon authentication, the user can request withdrawal of cash via touchscreen interface 510. ATM 500 can confirm availability of the requested funds, and cause cash dispenser 514 to output the cash. In some implementations, cash dispenser 514 can further accept deposits of cash and/or checks, as requested by the user via touchscreen interface 510.

Card dispenser 516 can include card encoder 518, card printer 520, and/or card embosser 522. Card encoder 518 can be any device capable of encoding and/or programming an electronically readable payment card, such as a debit card, a credit card, a gift card, etc. For example, in some implementations, card encoder 518 can include a magnetic stripe encoder. Alternatively or additionally, in some implementations, card encoder 518 can include a chip encoder (e.g., for an EMV chip).

Card printer 520 can, in some implementations, visually print payment instrument data onto the electronically readable payment card, such as a cardholder's name, a card number, a card verification value (CVV), and/or an expiration date for the card. In some implementations, card printer 520 can print such data on a generic card, such that it is personalized for the cardholder. Card embosser 522 can be configured to emboss one or more portions of payment instrument data onto the electronically readable card, such that there is a raised portion on the card (e.g., the card number). In some implementations, however, it is contemplated that card printer 520 and/or card embosser 522 can be omitted, and that card dispenser 516 can instead dispense a generic card as a temporary payment card.

Although illustrated and described as separate components, it is contemplated that any of two or more of the functions described can be performed by one or more composite devices, and/or by separate devices sharing a common input and/or output in ATM 500. For example, it is contemplated that, in some implementations, card scanner 512 and card dispenser 516 can share a common input/output slot in ATM 500. Thus, a separate slot for card dispenser 516 may not be needed, leaving ATM 500 compact in size and having a simpler user interface, despite its additional functionality described herein.

Figure 6:
FIG. 6 is a conceptual diagram illustrating an exemplary ATM according to some implementations.

FIG. 6 is a conceptual diagram illustrating an exemplary automated teller machine (ATM) 600 according to some implementations. As one example, ATM 600 can be an exemplary physical structure embodying the components of ATM 500 of FIG. 5, described further above. In some implementations, ATM 600 can execute any one or more of the functions of the ATM described throughout. Although illustrated as including particular components, it is contemplated that ATM 600 can include any combination of components for executing one or more the functions described herein, such as fewer components, or additional components included in conventional ATMs, as appreciated by one skilled in the art.

ATM 600 can include display 604. Display 604 can be any suitable display, such as a light emitting diode (LED) display, a liquid crystal display (LCD), a cathode ray tube (CRT) display, etc. In some implementations, display 604 can be a touchscreen display. In some implementations, however, display 604 need not be a touchscreen display, and ATM 600 can instead have input mechanisms 616, 618A-618B to facilitate usage of ATM 600. For example, input mechanism 616 can be a numerical pad, while input mechanisms 618A-618B can be buttons provided to select options displayed on display 604. In some implementations, such input mechanisms 616, 618A-618B can be provided in conjunction with a touchscreen display 604. In some implementations, display 604 can perform the same functions described herein with respect to touchscreen interface 510 of FIG. 5.

In some implementations, ATM 600 can further include camera 602, which can perform both surveillance for security of ATM 600 and its users, as well as image capture of users of ATM 600 for authentication purposes. For example, in some implementations, camera 602 can capture an image of a user at ATM 600, and ATM 600 can perform facial recognition techniques to authenticate the user for access to ATM 600 and its various functions. In some implementations, camera 602 can perform the functions described herein with respect to camera 502 and/or iris scanner 504 of FIG. 5. In some implementations, however, ATM 600 can employ a separate iris scanner (not shown) for authenticating the identity of a user, similar to that described with respect to iris scanner 504 of FIG. 5. In some implementations, ATM 600 can include fingerprint scanner 608 to authenticate the identity of a user, as described further herein with respect to fingerprint scanner 506 of FIG. 5.

In some implementations, ATM 600 can authenticate the identity of a user using the user's bank or credit card and a personal identification number (PIN). For example, the user can enter a card into card scanner 612 (which, in some implementations, can be similar to card scanner 512 of FIG. 5). Card scanner 612 can read the card, and display 604 can prompt the user to enter the associated PIN number via input mechanism 616. Upon confirmation that the correct PIN number was entered, the user can be authenticated. ATM 600 can then provide the user with access to any of its functions described herein, such as requesting an electronically readable payment card via display 604 and/or input mechanisms 618A-618B, encoding an electronically readable payment card based on payment instrument data, receiving an electronically readable payment card via card dispenser 620, etc. ATM 600 can further provide the user with access to financial transactions, such as withdrawing cash via cash dispenser 606 (which can be similar to cash dispenser 514 of FIG. 5), depositing checks and/or cash via deposit handler 610, etc.

Figure 7:
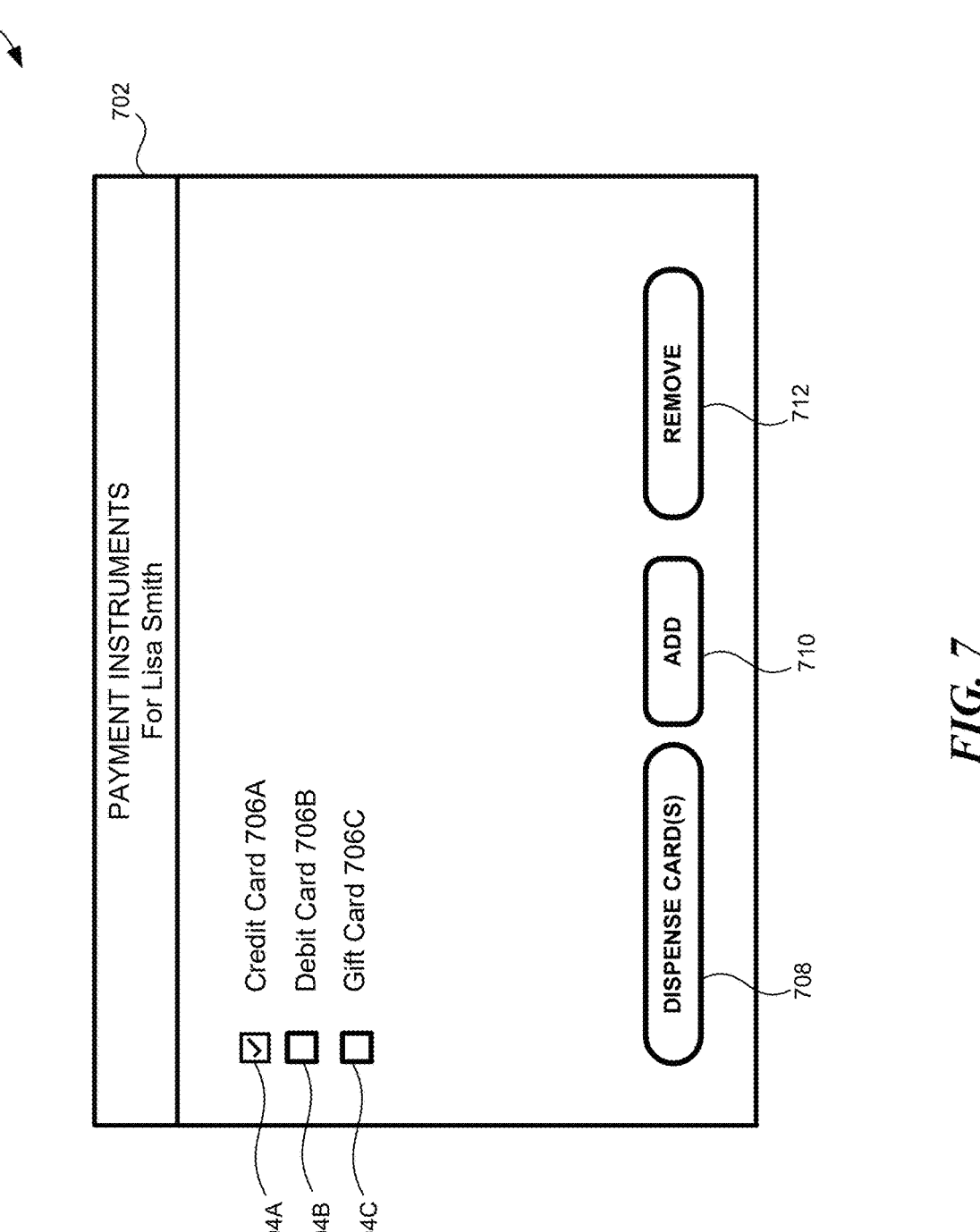
FIG. 7 is a conceptual diagram illustrating an example graphical user interface (GUI) for an ATM providing card replacement services.

FIG. 7 is a conceptual diagram illustrating an example graphical user interface (GUI) 700 for an automated teller machine (ATM) providing card replacement services. In some implementations, GUI 700 can be displayed on touchscreen interface 510 of FIG. 5 and/or display 604 of FIG. 6. In some implementations, GUI 700 can be displayed by the ATM in response to a user selection to access payment instruments menu 702 listing stored payment instruments for which electronically readable cards can be encoded and dispensed. For example, payment instruments menu 702 can be displayed based on a touch selection from a main menu or home screen, based on selection of a physical button associated with accessing payment instruments menu 702, and/or based on an audible announcement requesting access to payment instruments menu 702.

In some implementations, GUI 700 can be displayed automatically by the ATM upon authentication of the user (e.g., "Lisa Smith" in exemplary GUI 700). For example, GUI 700 can be displayed automatically based on the user pre-requesting card replacement services, such as through an application executed on the user's computing device, after authenticating the user via the ATM. In some implementations, it is contemplated that GUI 700 can alternatively or additionally be displayed on the user's computing device, from which the user can pre-request an electronically readable payment card, and have the card automatically dispensed by the ATM upon authentication. In other words, in some implementations, the user can bypass the display of GUI 700 on the ATM by instead pre-requesting an electronically readable payment card, corresponding to a particular payment instrument, via GUI 700 displayed on the user's computing device.

GUI 700 can include a list of payment instruments 706A-706C, having corresponding payment instrument data stored in association with an identifier of the authenticated user, that are available to be encoded and dispensed by the ATM via selection from payment instruments menu 702. In this example, payment instruments 706A-706C can include credit card 706A, debit card 706B, and gift card 706C. In some implementations, payment instrument data for one or more of payment instruments 706A-706C can be obtained directly from a computing system of the respective issuer of the payment instrument, such as the bank issuing credit card 706A, the bank issuing debit card 706B, the store for which gift card 706C is valid, etc. In some implementations, payment instrument data for one or more of payment instruments 706A-706C can be obtained via a previous scan of a corresponding electronically readable payment card, such as when the card was swiped at the ATM (or a different ATM in operable communication with the ATM, such as another ATM controlled by the same entity).

In some implementations, payment instrument data for one or more of payment instruments 706A-706C can be obtained from a computing device of the user, such as by a user accessing a website associated with the ATM and entering a card number, expiration date, card verification value (CVV), etc. In some implementations, payment instrument data for one or more of payment instruments 706A-706C can be obtained from a virtual wallet executing on the user's computing device by the user tapping the computing device to a wireless reader on the ATM (e.g., a Bluetooth reader). In some implementations, payment instrument data for one or more of payment instruments 706A-706C can be input directly into the ATM, such as by the user using a keyboard to enter the data after selecting option 710, for example.

Payment instruments 706A-706C can have associated respective input selection elements 704A-704C presented via GUI 700, which the user can toggle using a touchscreen or other input device to select one or more of payment instruments 706A-706C. In this example, the user has selected credit card 706A via input selection element 704A. The user can then select an action to execute relative to the selected payment instrument. For example, the user can select option 708 to encode and dispense an electronically readable card. The user can select option 710 to add a payment instrument to those listed on payment instruments menu 702 (e.g., by swiping an existing payment card, by manually entering payment instrument data via a touchscreen or keyboard, by wireless transmitting payment instrument data from a mobile device, etc.). The user can select option 712 to remove payment instrument data corresponding to one or more of payment instruments 706A-706C from that stored in associated with the user.

Figure 8:
FIG. 8 is a conceptual diagram illustrating an example magnetic stripe card that can be encoded and dispensed by an ATM according to some implementations.
Figure 8:
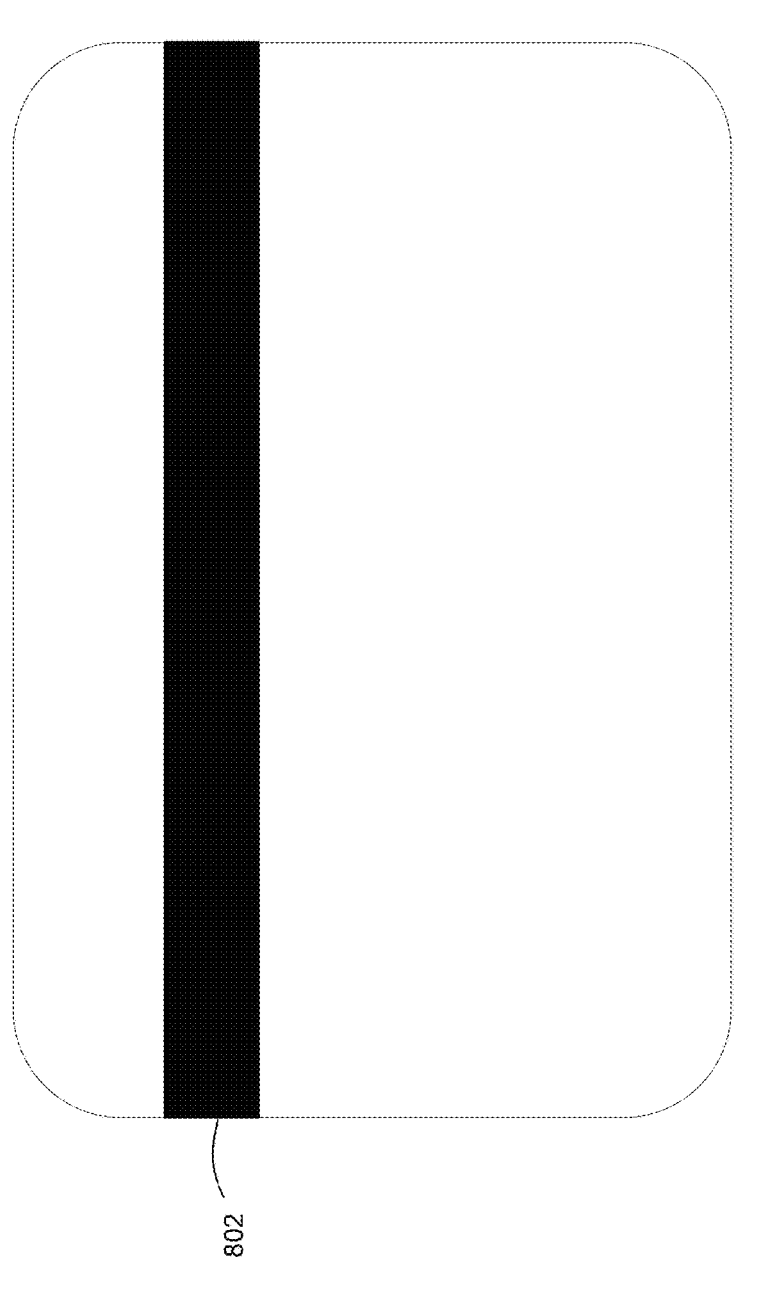

FIG. 8 is a conceptual diagram illustrating an example magnetic stripe card 800 that can be encoded and dispensed by an automated teller machine (ATM) according to some implementations. In some implementations, magnetic stripe card 800 can be an electronically readable payment card as described further herein. In some implementations, magnetic stripe card 800 can have the form, size, and shape of a standard payment card as appreciated by one skilled in the art, and can be made of any suitable material (e.g., plastic). Magnetic stripe card 800 can include magnetic stripe 802, which can be readable by a conventional magnetic stripe reader, such as at a point of sale.

The ATM described herein can encode magnetic stripe 802 by applying a magnetic field to change the polarity of magnetic particles in magnetic stripe 802, thus creating a pattern of positive and negative magnetic stripe fields corresponding to sets of binary ones and zeroes. These bits can be translated by a magnetic card reader into payment instrument data, such as a card number, a cardholder's name, an expiration data, a billing zip code, a card verification value (CVV), etc. As illustrated in FIG. 8, in some implementations, magnetic stripe card 800 can be a generic card that omits visual payment instrument data. Thus, in some implementations, magnetic stripe card 800 can be a temporary payment card (e.g., valid for 30 days) that can be replaced with a permanent card later, such as when printed and issued at a bank branch or headquarters.

Figure 9:
FIG. 9 is a conceptual diagram illustrating an example chip card that can be encoded and dispensed by an ATM according to some implementations.

FIG. 9 is a conceptual diagram illustrating an example chip card 900 that can be encoded and dispensed by an automated teller machine (ATM) according to some implementations. In some implementations, chip card 900 can be an electronically readable payment card as described further herein. In some implementations, chip card 900 can have the form, size, and shape of a standard payment card as appreciated by one skilled in the art, and can be made of any suitable material (e.g., plastic). Chip card 900 can include chip 902, which can be readable by a conventional chip reader, such as at a point of sale. Chip 902 can be a metallic computer chip storing payment instrument data, such as an EMV chip. The ATM described herein can encode chip 902 with such payment instrument data, and, when read by a chip reader, chip 902 can create a one-time use code (e.g., a token) to process a transaction instead of the card number 904. Thus, card number 904 is not electronically transmitted or received in a transaction, making chip card 900 more secure than magnetic stripe card 800 FIG. 8 in some implementations. In some implementations, however, it is contemplated that chip card 900 can additionally include a magnetic stripe as shown and described with respect to FIG. 8.

As illustrated in FIG. 9, in some implementations, the ATM can print and/or emboss chip card 900 with at least some of the payment instrument data encoded into chip 902. For example, the ATM can emboss card number 904 onto chip card 900, and can print cardholder name 906 and expiration date 908 onto chip card 900. Thus, chip card 900 can be a "permanent" payment card, i.e., having a standard 3-year expiration date, that is fully acceptable and usable at points of sale within that time frame.

As noted above, although described herein as primarily related to electrically readable payment cards, it is contemplated that the implementations described herein can be similarly applied to provide any other electronically readable card. For example, the implementations described herein can be used to encode and dispense membership cards, identification cards, etc., having provided or stored associated data (e.g., cardholder name, identification number, etc.). Further, although described primarily herein as encoding the electronically readable card via a magnetic stripe or chip, it is contemplated that the implementations described herein can alternatively or additionally encode data using other coding means (e.g., a bar code, a quick response (QR) code, etc.), and can print such codes onto the electronically readable cards described herein.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing card replacement services by an automated teller machine, the method comprising:

authenticating, by the automated teller machine, a user of the automated teller machine;

receiving a request, in response to an electronic communication from a mobile device of the user, for an electronically readable payment card, wherein the request is related to an electronically readable payment card previously registered with an entity in communication with the automated teller machine, and wherein the registering included making data for one or more payment instruments available to be requested at automated teller machines;

accessing, based on the authenticating of the user and the previous registration of the electronically readable payment card, the pre-registered data for the one or more payment instruments;

determining that the data, for the one or more payment instruments, includes payment instrument data for a payment instrument, of the one or more payment instruments, corresponding to the electronically readable payment card requested; and providing the electronically readable payment card with the payment instrument data.

2. The method of claim 1, wherein providing the electronically readable payment card includes encoding a magnetic stripe on the electronically readable payment card with the payment instrument data.

3. The method of claim 1, wherein providing the electronically readable payment card includes programming a chip in the electronically readable payment card with the payment instrument data.

4. The method of claim 1, wherein the payment instrument, corresponding to the electronically readable payment card requested by the user, was issued by a third party entity separate from an entity controlling the automated teller machine.

5. The method of claim 1, wherein payment instrument data is stored by, and obtained from, a computing system of a financial entity associated with the payment instrument, of the one or more payment instruments, corresponding to the electronically readable payment card requested by the user.

6. The method of claim 1, wherein the providing the electronically readable payment card by the automated teller machine initiates a time period after which the payment instrument data becomes invalid.

7. The method of claim 1, wherein the registering by making data for one or more payment instruments available to be requested at automated teller machines is performed by a previous interaction between another instance of the electronically readable payment card and a second automated teller machine other than the automated teller machine.

8. The method of claim 7, wherein the previous interaction between the other instance of the electronically readable payment card and the second automated teller machine was the user entering the other instance of the electronically readable payment card in the second automated teller machine.

9. The method of claim 1, wherein the registering by making data for one or more payment instruments available to be requested at automated teller machines is performed by the user entering card details on a website.

10. The method of claim 1, wherein the registering by making data for one or more payment instruments available to be requested at automated teller machines is performed by the user linking the entity in communication with the automated teller machine with an entity that provided the electronically readable payment card.

11. The method of claim 1, wherein the request for the electronically readable payment card is received in response to the user accessing a card manager on the mobile device and selecting the electronically readable payment card in the card manager.

12. The method of claim 11, wherein the selecting the electronically readable payment card in the card manager causes the mobile device to send the request, via a network, to the automated teller machine.

13. The method of claim 1, wherein the providing the electronically readable payment card includes providing an electronic version of the electronically readable payment card to the mobile device, which stores the electronic version of the electronically readable payment card in an electronic wallet.

14. The method of claim 1, wherein the providing the electronically readable payment card includes encoding a chip on the electronically readable payment card with a token generated in response to a previous transaction using the electronically readable payment card.

15. A computer-readable storage medium storing instructions, for providing card replacement services by an automated teller machine, the instructions, when executed by a computing system, cause the computing system to:

authenticate a user of the automated teller machine;

receive a request, in response to an electronic communication from a mobile device of the user, for an electronically readable payment card;

wherein the request is related to an electronically readable payment card previously registered with an entity in communication with the automated teller machine, and wherein the registering included making data for one or more payment instruments available to be requested at automated teller machines;

access, based on the authenticating of the user and the previous registration of the electronically readable payment card, the pre-registered data for the one or more payment instruments;

determine that the data, for the one or more payment instruments, includes payment instrument data for a payment instrument, of the one or more payment instruments, corresponding to the electronically readable payment card requested; and cause the automated teller machine to provide the electronically readable payment card with the payment instrument data.

16. The computer-readable storage medium of claim 15, wherein the payment instrument, corresponding to the electronically readable payment card requested by the user, was issued by a third party entity separate from an entity controlling the automated teller machine.

17. The computer-readable storage medium of claim 15, wherein the electronically readable payment card is a debit card, a credit card, or a gift card.

18. An automated teller machine for providing card replacement services, the automated teller machine comprising:

a card encoder configured to encode an electronically readable payment card;

one or more processors; and one or more memories storing instructions that, when executed by the one or more processors, cause a computing system, of the automated teller machine, to:

authenticate a user of the automated teller machine;

receive a request, in response to an electronic communication from a mobile device of the user for the electronically readable payment card;

wherein the request is related to an electronically readable payment card previously registered with an entity in communication with the automated teller machine, and wherein the registering included making data for one or more payment instruments available to be requested at automated teller machines;

access, based on the authenticating of the user and the previous registration of the electronically readable payment card, the pre-registered data for the one or more payment instruments;

determine that the data, for the one or more payment instruments, includes payment instrument data for a payment instrument, of the one or more payment instruments, corresponding to the electronically readable payment card requested; and cause the card encoder to encode the electronically readable payment card with the payment instrument data.

19. The automated teller machine of claim 18, further comprising:

a card printer, wherein the instructions, when executed by the one or more processors, further cause the automated teller machine to:

prior to causing the card dispenser to dispense the electronically readable payment card, cause the card printer to print at least a portion of the payment instrument data on the electronically readable payment card.

20. The automated teller machine of claim 18, wherein the automated teller machine is configured to receive the request and dispense the electronically readable payment card in a single transaction.

* * * * *